(12) United States Patent
Wu et al.

(10) Patent No.: US 11,938,401 B2
(45) Date of Patent: Mar. 26, 2024

(54) AUDIO PLAYING METHOD AND APPARATUS, AND STORAGE MEDIUM THEREOF

(71) Applicant: TENCENT TECHNOLOGY (SHENZHEN) COMPANY LIMITED, Shenzhen (CN)

(72) Inventors: Xiayu Wu, Shenzhen (CN); Dan Wu, Shenzhen (CN)

(73) Assignee: TENCENT TECHNOLOGY (SHENZHEN) COMPANY LIMITED, Guangdong (CN)

(*) Notice: Subject to any disclaimer, the term of this patent is extended or adjusted under 35 U.S.C. 154(b) by 822 days.

(21) Appl. No.: 17/060,915

(22) Filed: Oct. 1, 2020

(65) Prior Publication Data

US 2021/0019346 A1 Jan. 21, 2021

Related U.S. Application Data

(63) Continuation of application No. PCT/CN2019/102813, filed on Aug. 27, 2019.

(30) Foreign Application Priority Data

Aug. 31, 2018 (CN) .......................... 201811013622.2

(51) Int. Cl.
*A63F 13/54* (2014.01)
*A63F 13/69* (2014.01)
(Continued)

(52) U.S. Cl.
CPC .............. *A63F 13/54* (2014.09); *A63F 13/69* (2014.09); *G06F 3/165* (2013.01); *G06F 16/638* (2019.01); *G06F 16/65* (2019.01)

(58) Field of Classification Search
None
See application file for complete search history.

(56) References Cited

U.S. PATENT DOCUMENTS 6,572,475 B1 6/2003 Okabe et al.
2009/0247298 A1* 10/2009 Tokuhara ................ A63F 13/45
463/43
(Continued)

FOREIGN PATENT DOCUMENTS

CN 107115672 * 1/2017 ............. A63F 13/54
CN 107115672 9/2017
(Continued)

OTHER PUBLICATIONS

Office Action for Chinese Patent Application No. CN 2018110136222 dated Dec. 4, 2019; 9 pages.
(Continued)

*Primary Examiner* — Jason T Yen
(74) *Attorney, Agent, or Firm* — Crowell & Moring LLP

(57) ABSTRACT

An audio playing method and apparatus, a terminal and a non-transitory machine-readable storage medium are disclosed in this application. The method may include obtaining behavior information or appearance information of a virtual object; in response to detecting that the behavior information or the appearance information satisfies a play triggering condition, obtaining an audio resource matching the play triggering condition, the play triggering condition being determined according to attribute information of the virtual object; and playing the audio resource matching the play triggering condition.

18 Claims, 6 Drawing Sheets

(51) Int. Cl.
*G06F 3/16* (2006.01)
*G06F 16/638* (2019.01)
*G06F 16/65* (2019.01)

(56) References Cited

U.S. PATENT DOCUMENTS

| | | | |
|---|---|---|---|
| 2010/0099497 A1* | 4/2010 | Nagayama | A63F 13/35 |
| | | | 463/43 |
| 2016/0354693 A1 | 12/2016 | Yan et al. | |
| 2017/0195816 A1 | 7/2017 | Shih et al. | |
| 2018/0047391 A1* | 2/2018 | Baik | G10L 15/1815 |
| 2019/0138266 A1* | 5/2019 | Takechi | H04L 51/58 |

FOREIGN PATENT DOCUMENTS

| | | |
|---|---|---|
| CN | 107294838 | 10/2017 |
| CN | 107890673 | 4/2018 |
| CN | 108355356 | 8/2018 |
| CN | 109144610 | 1/2019 |
| JP | 2018-77738 | 5/2018 |
| WO | WO 2017/185762 A1 | 11/2017 |

OTHER PUBLICATIONS

Office Action for Chinese Patent Application No. CN 2018110136222 dated Jun. 23, 2020; 6 pages.
International Search Report issued in International Application No. PCT/CN2019/102813 dated Aug. 27, 2019.
Extended European Search Report of European Application 19854477.7, dated Jul. 20, 2021, 13 pages.

* cited by examiner

AUDIO PLAYING METHOD AND APPARATUS, AND STORAGE MEDIUM THEREOF

RELATED APPLICATION

This application is a continuation application of PCT Patent Application No. PCT/CN2019/102813, filed on Aug. 27, 2019, which claims priority to Chinese Patent Application No. 201811013622.2, entitled "AUDIO PLAYING METHOD AND APPARATUS, ELECTRONIC DEVICE, AND COMPUTER-READABLE STORAGE MEDIUM" filed with the China National Intellectual Property Administration on Aug. 31, 2018, wherein the content of each of the above-referenced applications is incorporated by reference in its entirety.

FIELD OF THE TECHNOLOGY

This application relates to the field of computer technologies, and in particular, to an audio playing method and apparatus, a terminal, and a non-transitory machine-readable storage medium.

BACKGROUND OF THE DISCLOSURE

With the development of computer technologies and diversification of terminal functions, an increasing variety of games can be played on a terminal. In an electronic game, to make a virtual object real, a terminal generally may control the virtual object to make an action or expression, or may play a corresponding audio resource when displaying a specific state of the virtual object or controlling the virtual object to make a specific action.

Currently, in an audio playing method, a correspondence between existing audio resources and known play triggering conditions is generally stored in advance, where the known play triggering conditions may be tangible artistic materials or direct program logic, for example, displaying an appearance of a virtual object, and playing a specific action animation of the virtual object. Therefore, upon detection that a specific play triggering condition is satisfied, an audio resource corresponding to the play triggering condition may be obtained and played according to the foregoing correspondence.

The process of storing the correspondence between the virtual objects and the audio resources in advance in the foregoing method requires high maintenance costs and is low in efficiency. Moreover, to enrich images of a virtual object, an image of the virtual object may be generated randomly. In this case, the process of storing the correspondence between the existing virtual objects and the known audio resources in advance in the foregoing audio playing method cannot ensure that a play triggering condition of a newly generated virtual object falls within the range of the known play triggering conditions. Moreover, information of the virtual object may change, while the foregoing correspondence cannot be changed. Therefore, an audio playing effect in the foregoing audio playing method may fail to reflect images or states of the virtual object comprehensively and accurately, resulting in poor adaptability.

SUMMARY

According to various embodiments of this application, an audio playing method and apparatus, and a non-transitory machine-readable storage medium are provided. The technical solutions are as follows:

According to one aspect, an audio playing method is provided. The method may include obtaining behavior information or appearance information of a virtual object. The method may further include, in response to detecting that the behavior information or the appearance information satisfies a play triggering condition, obtaining an audio resource matching the play triggering condition. The method may further include playing the audio resource matching the play triggering condition.

According to one aspect, an audio playing apparatus is provided. The apparatus may include a memory operable to store program code and a processor operable to read the program code. The processor is configured to obtain behavior information or appearance information of a virtual object. The processor is further configured to, in response to detecting that the behavior information or the appearance information satisfies a play triggering condition, obtain an audio resource matching the play triggering condition. The processor is further configured to play the audio resource matching the play triggering condition.

According to one aspect, a non-transitory machine-readable storage medium is provided. The non-transitory storage medium may have processor executable instructions stored thereon for causing a processor to obtain behavior information or appearance information of a virtual object. The processor executable instructions may further cause the processor to, in response to detecting that the behavior information or the appearance information satisfies a play triggering condition, obtain an audio resource matching the play triggering condition. The processor executable instructions may further cause the processor to play the audio resource matching the play triggering condition.

Details of one or more embodiments of this application are provided in the accompany drawings and descriptions below. Other features, objectives, and advantages of this application will become apparent from the specification, the accompanying drawings, and the claims.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from these accompanying drawings without creative efforts.

DESCRIPTION OF EMBODIMENTS

To make the objectives, technical solutions, and advantages of this application clearer, the following further describes this application in detail with reference to the accompanying drawings and the embodiments. It is to be understood that the specific embodiments described herein are only used to describe this application, instead of limiting this application. All other embodiments obtained by a person of ordinary skill in the art based on the embodiments of this application without creative efforts shall fall within the protection scope of this application.

The embodiments of this application mainly relate to an electronic game scene or a simulated training scene. Using the electronic game scene as an example, a user may perform an operation on the terminal in advance. After detecting the operation of the user, the terminal may download a game configuration file of an electronic game, where the game configuration file may include an application program, interface display data, virtual scene data, or the like of the electronic game, so that the user may invoke the game configuration file when logging onto the electronic game on the terminal, to render and display an electronic game interface. The terminal may receive a touch operation of the user. After detecting the touch operation, the terminal may determine game data corresponding to the touch operation, and render and display the game data. The game data may include data of a virtual scene, behavior data of a virtual object in the virtual scene, and the like. In some embodiments, the terminal may further display a real-world scene acquired by a camera, and display the virtual object in the real-world scene.

The virtual scene in this embodiment may be used for simulating a three-dimensional virtual space, or a two-dimensional virtual space. The three-dimensional virtual space or the two-dimensional virtual space may be an open space. The virtual scene may be used for simulating a real environment in a real world. Definitely, in some embodiments, the virtual scene may correspond to a real-world scene. For example, the terminal may obtain location information of the terminal, to obtain and display, based on the location information, a virtual scene corresponding to the location information. For example, the terminal is at a location A in a real-world scene, the terminal is located on a road B in the real-world scene, and there are buildings C, D, and E nearby. In this case, after obtaining the location of the terminal, the terminal may display a virtual scene in an interface. In the virtual scene, a virtual object is at a location A', and the location A' corresponds to the location A in the real-world scene. In the virtual scene, the virtual object is located on a road B', and there are buildings C', D', and E' nearby, where the road B' corresponds the road B, and the buildings C', D', and E' correspond to the buildings C, D, and E.

Figure 1:
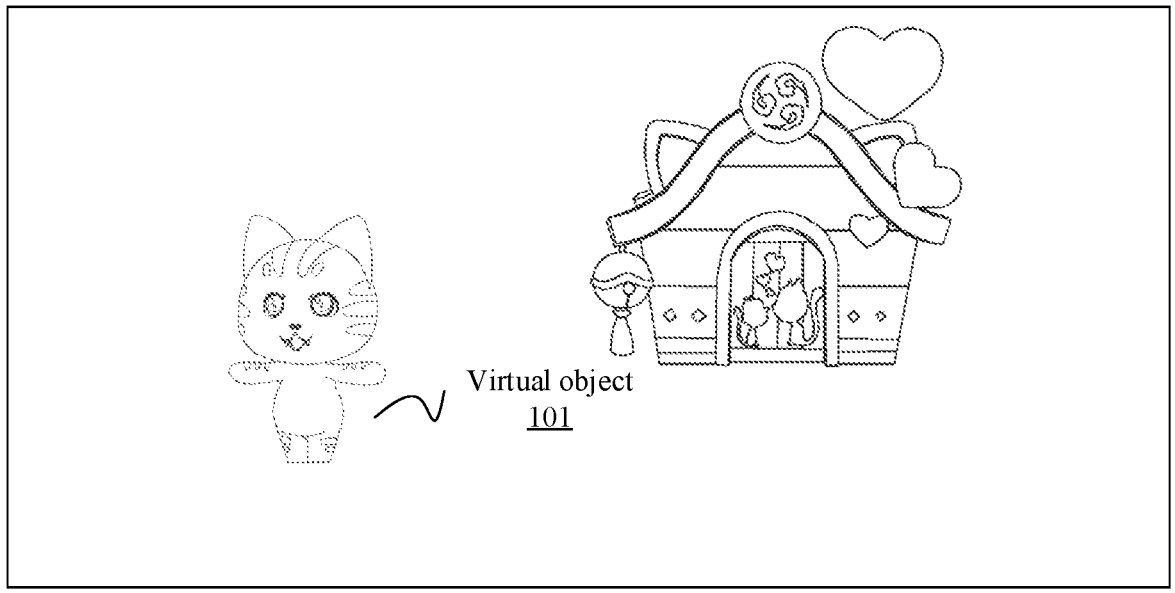
FIG. 1 is a schematic diagram of a terminal interface according to an embodiment of this application.

The virtual scene may include a plurality of virtual objects. The virtual object may be a virtual figure in the virtual scene for representing the user or another figure. The virtual figure may be in any form, for example, a human being, or an animal, which is not limited in this application. The virtual scene may include a plurality of virtual objects. Each virtual object has its own shape and volume in the virtual scene, and occupies some space in the virtual scene. In some embodiments, the terminal may control the virtual object to make different expressions and actions, for example, an angry look, a happy look, and turning around. The terminal may further display, according to a touch operation of the user, the virtual object making a corresponding action, to simulate an interaction between the virtual object and the user. For example, when the terminal receives, at a position where the virtual object is displayed, a stirring operation of the user, the terminal may control the virtual object to turn around or the like. As shown in FIG. 1, the virtual object 101 may be a pet cat, and the terminal may further display other virtual props, for example, a house of the pet cat.

Figure 2:
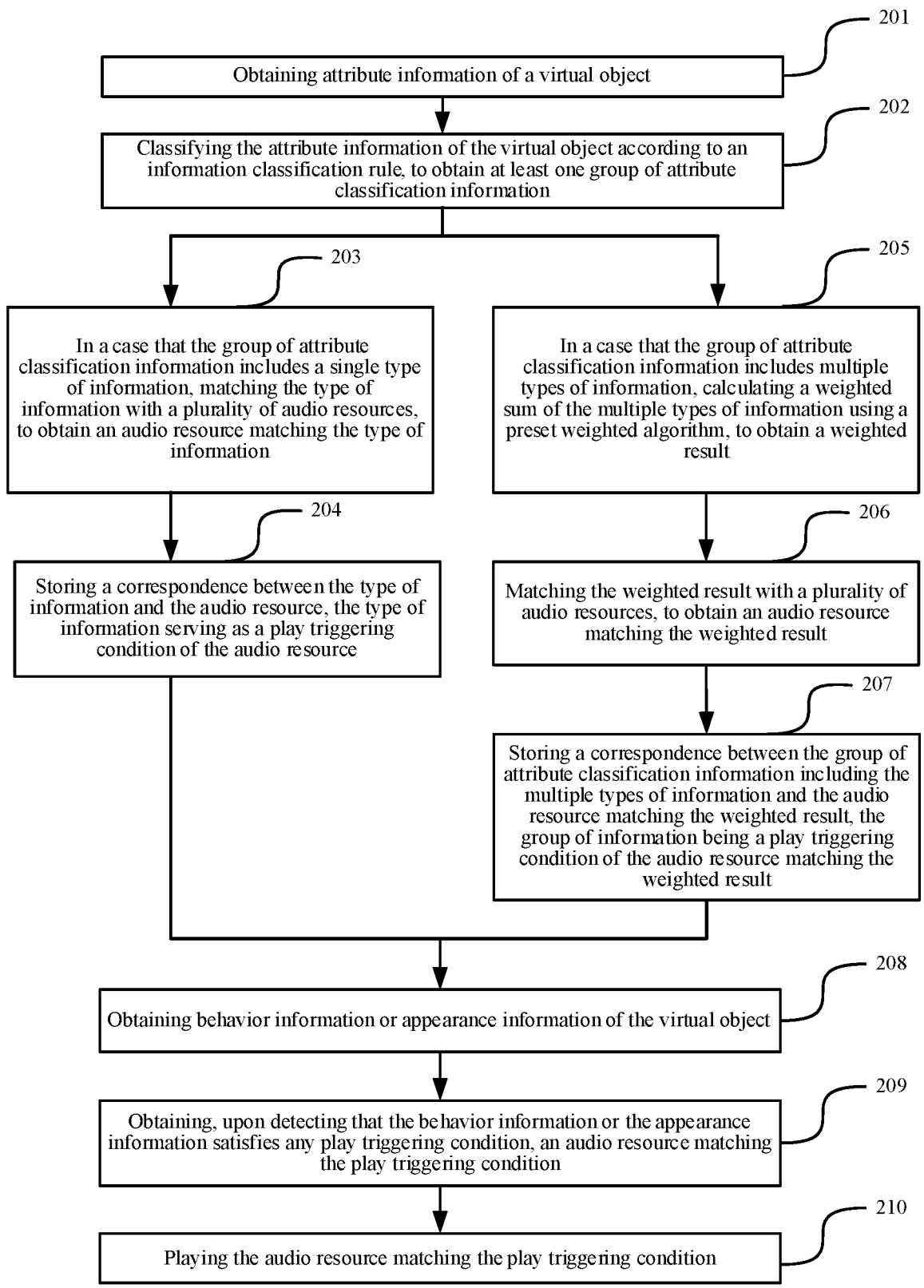
FIG. 2 is a flowchart of an audio playing method according to an embodiment of this application.

FIG. 2 is a flowchart of an audio playing method according to an embodiment of this application. Referring to FIG. 2, the method may include the following steps:

Step 201: A terminal obtains attribute information of a virtual object.

The attribute information may include appearance display information, behavior information, a gender, a personality or the like of the virtual object. For example, the attribute information may be an expression, a jump action, the gender, or the personality of the virtual object. In this embodiment of this application, the terminal may obtain the attribute information of the virtual object, and determine, according to the attribute information of the virtual object, which audio resource can be played by the terminal when displaying a specific appearance of the virtual object or playing a specific action animation of the virtual object, so as to enrich images of the virtual object. Displaying a specific appearance of the virtual object or playing a specific action animation of the virtual object is a play triggering condition of the audio resource. That is, the terminal may determine, according to the attribute information of the virtual object, a play triggering condition for playing the audio resource corresponding to the virtual object.

In some embodiments, the terminal may obtain partial attribute information of the virtual object. Classes of the partial attribute information to be obtained may further be preset in the terminal, so that the terminal may obtain the foregoing classes of the attribute information of the virtual object, to determine, based on such attribute information, the audio resource corresponding to the attribute information of the virtual object.

For example, in an electronic game scene, the terminal receives an operation of a user. After detecting the operation of the user, the terminal may obtain a virtual object. Information classes of the virtual object may be stored in the terminal in advance. For each class, at least one piece of information belonging to the class may be stored in the terminal in advance. When obtaining the virtual object, the terminal may randomly obtain one piece of attribute information from the at least one piece of attribute information of each class, and use the obtained attribute information as one piece of attribute information of the virtual object. In this way, the terminal may determine the attribute information of the virtual object. After determining the attribute information of the virtual object, the terminal may perform the following steps to determine an audio resource corresponding to a specific piece or specific pieces of attribute information of the virtual object.

A plurality of audio resources are stored in the terminal in advance, so that the terminal may determine, based on the obtained attribute information of the virtual object, an audio resource corresponding to the attribute information of the virtual object from the plurality of audio resources stored in advance. The plurality of audio resources are obtained based on a plurality of audio files. Specifically, a process of obtaining the plurality of audio resources may include the following step (1) and step (2):

(1) The terminal obtains a plurality of audio sample files.

The audio sample file refers to an original file of an audio. In this embodiment of this application, to enrich images of the virtual object, the terminal may process the audio sample files, to obtain audio resources that can reflect different images of the virtual object, for example, different genders, different pitches, or different emotions. The terminal may obtain a plurality of audio sample files, and perform the following step (2) to process the audio sample files.

(2) The terminal processes the plurality of audio sample files, to obtain a plurality of audio resources, where a quantity of the audio resources is greater than a quantity of plurality of the audio sample files.

For each audio sample file, the terminal may perform processing, such as tone modification processing, frequency modification processing or speed modification processing, on the audio sample file, to obtain a plurality of different audio resources. That is, step (2) may be as follows: performing tone modification processing, frequency modification processing or speed modification processing on the plurality of audio sample files, to obtain a plurality of audio resources. This is not limited in this embodiment of this application. For example, after the foregoing processing is performed on an audio sample file, audio resources with different pitches or audio resources with different speeds may be obtained, which can be used for reflecting different images of the virtual object, for example, different genders, different emotions, or different tones.

In some embodiments, in step (2), after processing the plurality of audio sample files to obtain the plurality of audio resources, the terminal may further obtain identification information of each audio resource, and store the plurality of audio resources and the identification information of each audio resource in a corresponding manner, where the identification information is used for representing information about the virtual object corresponding to the audio resource.

Definitely, in some embodiments, the foregoing step (1) and step (2) may alternatively be performed by a server. After obtaining a plurality of audio resources, the server may send the plurality of audio resources to the terminal, so that the plurality of audio resources are stored in the terminal in advance. A specific implementation is not limited in this embodiment of this application.

Step 202: The terminal classifies the attribute information of the virtual object according to an information classification rule, to obtain at least one group of attribute classification information, and performs the following step 203 and step 204 or perform the following step 205 to step 207 based on the at least one group of attribute classification information.

To make the audio resource better fit the image of the virtual object so that the audio resource reflects the image of the virtual object more authentically, the information classification rule may be preset in the terminal. After obtaining information of the virtual object, the terminal may classify the information of the virtual object according to the information classification rule, to obtain at least one group of attribute classification information, so that for each group of attribute classification information, a matching audio resource is determined. Each group of attribute classification information corresponds to one behavior or one appearance of the virtual object. The information classification rule may be preset by a related technician, and is not specifically limited in this embodiment of this application.

For example, in the information classification rule, an expression, a gender and a personality of the virtual object may be classified into one group, and a jump action may be classified into another group, where the expression may further include an eye expression, a mouth expression, and the like. Correspondingly, if the virtual object is a female and has a lively personality, the audio resource of the virtual object may be an audio resource with a high pitch and fast tempo. Alternatively, if the expression of the virtual object is crying, the audio resource matching the expression may be an audio resource with content of a crying sound. Alternatively, an audio resource matching the jump action may be an audio resource with content of a laughing sound or an audio resource of cheering.

It may be appreciated that, for any group of attribute classification information in the at least one group of attribute classification information after the classification, if the group of attribute classification information includes only one type of information, the terminal may directly determine, according to the information, an audio resource matching the information. For details, refer to the following step 203 and step 204. If the group of attribute classification information includes multiple types of information, the terminal needs to take the multiple types of information into consideration to determine a matching audio resource. For details, refer to the following steps 205 to step 207. Details are not described herein.

Step 203: The terminal matches, for any group of attribute classification information in the at least one group of attribute classification information in a case that the any group of attribute classification information includes only one type of information, the information with a plurality of audio resources, to obtain an audio resource matching the information.

In the at least one group of attribute classification information, for a group of attribute classification information that includes only one type of information, the terminal may match the information with the plurality of audio resources. For example, if a group of attribute classification information only includes such a type of information as jump action, the terminal may match the information with the plurality of audio resources, to determine an audio resource matching the jump action. For example, in an electronic game scene, the jump action may correspond to specific lines of the virtual object.

In some embodiments, when the terminal classifies the information in the foregoing step 202, for such single-type information, the terminal may convert a form of the information into a target form. For example, the target form may be a character form or a character string form. Definitely, in another possible implementation, the information of the virtual object in the terminal is the target form, which is not limited in this embodiment of this application.

Corresponding to a possible implementation of step (2) in the foregoing step 201, the terminal may match the information with the identification information of the plurality of audio resources, to obtain identification information corresponding to the information, thus determining that the audio resource corresponding to the identification information is the audio resource matching the information. For example, the identification information of the audio resources may include 1, 2, 3, 4, . . . , n. Information that is obtained by the terminal and used for identifying the jump action may be 3. In this case, the terminal may determine that the audio resource with the identification information being 3 is the audio resource matching the jump action. The foregoing numerical values are merely an example for description, and are not limited in this embodiment of this application.

In some embodiments, in the foregoing matching process, the terminal may further calculate similarities between the information and the identification information of the plurality of audio resources. The terminal may use an audio resource corresponding to identification information with a highest similarity with the information as the audio resource matching the information.

In some embodiments, the terminal may further determine whether the calculated similarities are greater than a predetermined similarity threshold, and use similarities greater than the similarity threshold as candidate similarities, so that the terminal may select an audio resource corresponding to identification information with a highest similarity among the candidate similarities as the audio resource matching the information. If all the calculated similarities are less than the similarity threshold, it may be determined that the group of attribute classification information has no corresponding audio resource, that is, the group of attribute classification information is not used as a play triggering condition for playing an audio resource. The specific implementation is not limited in this embodiment of this application.

Step 204: The terminal stores a correspondence between the information and the audio resource matching the information, the information being a play triggering condition of the audio resource, and performs the following step 208 based on the determined play triggering condition.

After determining the audio resource matching each group of attribute classification information, the terminal may store the correspondence between the information and the audio resource, so that the information is used as the play triggering condition of the audio resource subsequently. When it is detected subsequently that the behavior information or appearance information of the virtual object satisfies the play triggering condition, the corresponding audio resource may be obtained and played according to the correspondence.

The foregoing step 203 and step 204 describe a process of determining, by the terminal, an audio resource matching a group of attribute classification information in the at least one group of attribute classification information in a case that the group of attribute classification information includes only one type of information. In some embodiments, a group of attribute classification information in the at least one group of attribute classification information may alternatively include multiple types of information, and in this case, the terminal may perform the following step 205 to step 207.

Step 205: The terminal calculates, for any group of attribute classification information in the at least one group of attribute classification information in a case that the any group of attribute classification information includes multiple types of information, a weighted sum of the multiple types of information using a preset weighted algorithm, to obtain a weighted result.

In the at least one group of attribute classification information, for a group of attribute classification information that includes multiple types of information, the terminal may determine an audio resource matching the group of attribute classification information by taking the multiple types of information included in the group of attribute classification information into consideration comprehensively. Specifically, a weighted algorithm is preset in the terminal. A quantity of weighted items in the weighted algorithm may be the same as a quantity of types of the information included in the group of attribute classification information. A weight of each type of information may be determined according to the multiple types of information or classes of the multiple types of information. The weighted algorithm and the weight of each type of information may be preset by a related technician, and are not limited in this embodiment of this application. The terminal may calculate, using the weighted algorithm, a weighted sum of the multiple types of information included in the group of attribute classification information, to obtain a weighted result, so that an audio resource matching the group of attribute classification information may be determined based on the weighted result.

For example, if a group of attribute classification information includes two types of information, the terminal may determine that the quantity of the weighted items of the weighted algorithm is 2, and determine respective weights of the two types of information according to specific content of the two types of information. Then, a weighted sum of the two types of information may be calculated, to obtain a weighted result. For example, if the expression of the virtual object is laugh till cry, the two types of information may be an eye expression and a mouth expression, which are cry (4) and laugh (5) respectively. In this case, weights of the two types of information are 0.2 and 0.8 respectively. Therefore, a weighted result is 4.8. For example, if a group of attribute classification information includes three types of information, the terminal may determine that the quantity of the weighted items of the weighted algorithm is 3, and determine respective weights of the three types of information according to specific content of the three types of information. Then, a weighted sum is calculated, to obtain a weighted result. The foregoing numerical values are merely an example for description, and are not limited in this embodiment of this application.

Step 206: The terminal matches the weighted result with a plurality of audio resources, to obtain an audio resource matching the weighted result.

After obtaining the weighted result of the multiple types of information, the terminal may match the weighted result with a plurality of audio resources, to determine an audio resource matching the weighted result. Specifically, similar to step 203, the terminal may alternatively match the weighted result with the identification information of the plurality of audio resources, to obtain identification information corresponding to the weighted result, thus determining that the audio resource corresponding to the identification information is the audio resource matching the weighted result.

Similarly, the terminal may alternatively calculate similarities between the weighted result and the identification information of the plurality of audio resources, and use an audio resource corresponding to identification information with a highest similarity with the weighted result as the audio resource matching the weighted result. Similarly, the terminal may alternatively determine whether the calculated similarities are greater than a similarity threshold, to determine candidate similarities, so that an audio resource corresponding to identification information with a highest similarity among the candidate similarities is selected as the audio resource matching the weighted result.

For example, the identification information of the audio resources may be 1, 2, 3, 4, 5, . . . , n, where content of the audio resource with the identification information 4 is cry, and content of the audio resource with the identification information 5 is laugh. If a group of attribute classification information includes two types of information, the two types of information may be an eye expression and a mouth expression, which are cry (4) and laugh (5) respectively. The expression of the virtual object is laugh till cry, and it is obtained that a weighted result of the group of attribute classification information is 4.8. The terminal matches the weighted result with the foregoing identification information, and determines that the weighted result (4.8) has a highest similarity with the identification information 5, thus determining that the audio resource matching the group of attribute classification information is the audio resource corresponding to the identification information 5.

Step 207: The terminal stores a correspondence between the any group of attribute classification information including the multiple types of information and the audio resource matching the weighted result, the any group of attribute classification information being a play triggering condition of the audio resource matching the weighted result, and performs the following step 208 based on the determined play triggering condition.

After determining the audio resource matching the weighted result, the terminal may store the correspondence between the group of attribute classification information including the multiple types of information and the audio resource matching the weighted result, so that the group of attribute classification information is used as the play triggering condition of the audio resource subsequently. When it is detected subsequently that the behavior information or appearance information of the virtual object satisfies the play triggering condition, the corresponding audio resource may be obtained and played according to the correspondence.

The foregoing step 205 to step 207 are a process of determining, by the terminal in a case that a group of attribute classification information in the at least one group of attribute classification information includes multiple types of information, an audio resource matching the group of attribute classification information. By taking the multiple types of information into consideration comprehensively, a current state of the virtual object can be analyzed more accurately, so as to determine an audio resource that can be played in the current state.

The foregoing step 203 and step 204 and step 205 to step 207 are a process of determining an audio resource matching each group of attribute classification information based on the at least one group of attribute classification information and the plurality of audio resources, where each group of attribute classification information serves as a play triggering condition of the audio resource. That is, through the foregoing process, the terminal may determine audio resources corresponding to the attribute information of the virtual object, and determine play triggering conditions of the audio resources, so that upon detection subsequently that the behavior information or appearance information of the virtual object satisfies a play triggering condition, a corresponding audio resource may be played. In the foregoing process, the terminal may determine a corresponding audio resource according to attribute information of a virtual object, and a play triggering condition of the audio resource may also be determined by the terminal based on the attribute information of the virtual object, and in a case that the attribute information of the virtual object is determined, accurate audio playing settings of the virtual object can be obtained. For virtual objects with different images, accurate audio playing settings can also be obtained through the foregoing steps. Therefore, an audio playing effect of each virtual object may comprehensively and accurately reflect the image or state of the virtual object, thus achieving good adaptability.

Step 208: The terminal obtains behavior information or appearance information of the virtual object.

After detecting a touch operation of a user, the terminal may display a virtual object in an interface, and display different appearances of the virtual object in the interface based on the touch operation of the user, or control the virtual object to make different actions.

In this embodiment of this application, based on the foregoing step 201 to step 207, the terminal has determined audio resources matching some appearances or some behaviors of the virtual object, and uses the appearances or behaviors as play triggering conditions. In this case, when displaying the virtual object, the terminal may obtain the behavior information or appearance information of the virtual object, to detect, based on the behavior information or appearance information, whether the determined play triggering condition is satisfied, thus implementing an audio playing process corresponding to the virtual object.

Step 209: The terminal obtains, upon detecting that the behavior information or the appearance information satisfies any play triggering condition, an audio resource matching the play triggering condition.

The play triggering condition is determined according to the attribute information of the virtual object. That is, by performing the foregoing step 201 to step 207, the terminal determines the play triggering condition for playing the audio resource of the virtual object. Then, in a case that the behavior information or appearance information obtained based on step 208 satisfies any determined play triggering condition, the terminal may obtain, based on the correspondence between the play triggering conditions and the audio resources determined in the foregoing step 203 and step 204 or step 205 to step 207, the audio resource matching the play triggering condition.

Step 210: The terminal plays the audio resource matching the play triggering condition.

The terminal may play the obtained audio resource, so that the playing of the audio resource matches the behavior or appearance of the virtual object, to enrich expressions of the virtual object and improve a display effect of the virtual object, thus improving user experience.

In some embodiments, the attribute information of the virtual object may alternatively change. For example, the age of the virtual object may grow, or the personality of the virtual object may change as the age grows, or the virtual object grasps a new skill as the age grows. For the changes in the attribute information of the virtual object, an updating mechanism for the correspondence between the information and the audio resources may further be set in the terminal.

Specifically, upon detecting that the attribute information of the virtual object is updated, the terminal performs again, based on updated attribute information, the steps of grouping the attribute information of the virtual object according to an information classification rule, to obtain at least one group of attribute classification information and determining an audio resource matching each group of attribute classification information based on the at least one group of attribute classification information and a plurality of audio resources. That is, the terminal performs the foregoing step 202 to step 207 again based on the updated attribute information, to re-determine a correspondence between the attribute information of the virtual object and the audio resources, that is, determine the audio resources corresponding the virtual object and the corresponding play triggering conditions. Through the updating mechanism, the terminal may determine an audio resource corresponding to the information of the virtual object. Therefore, an audio resource to be played may be updated as the virtual object changes, so that the played audio resource better fits the image of the virtual object, thus simulating a real-world scene more authentically.

Figure 3:
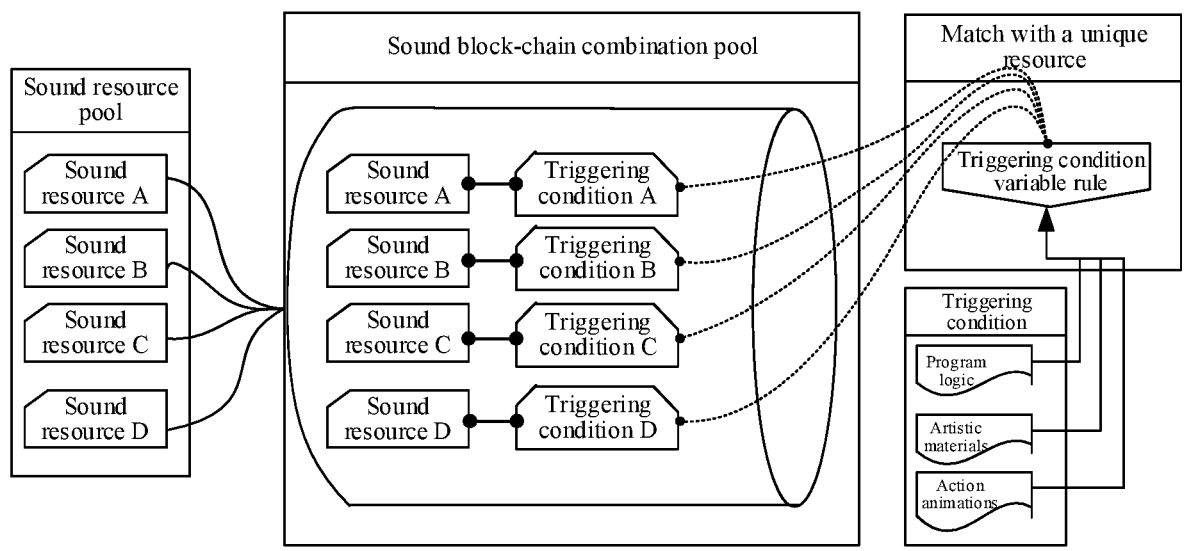
FIG. 3 is a schematic diagram of an audio playing method according to an embodiment of this application.

The foregoing audio playing method is described in detail below with reference to FIG. 3. Referring to FIG. 3, a sound resource pool may include a plurality of sound resources, that is, a plurality of audio resources, and there may be multiple types of play triggering conditions. For example, there may be three classes of play triggering conditions:

program logic, artistic materials, or action animations. Definitely, there may be other classes of play triggering conditions, which are not limited in this application. For the play triggering condition, a play triggering condition variable rule may be set based on the play triggering condition, which corresponds to the foregoing information classification rule. Then, at least one play triggering condition may be obtained, which corresponds to at least one group of attribute classification information. In this case, the terminal may determine a correspondence between the play triggering condition and an audio resource, and bind the play triggering condition to the audio resource, so that upon detection subsequently that the play triggering condition is satisfied, the corresponding audio resource may be obtained and played.

Figure 4:
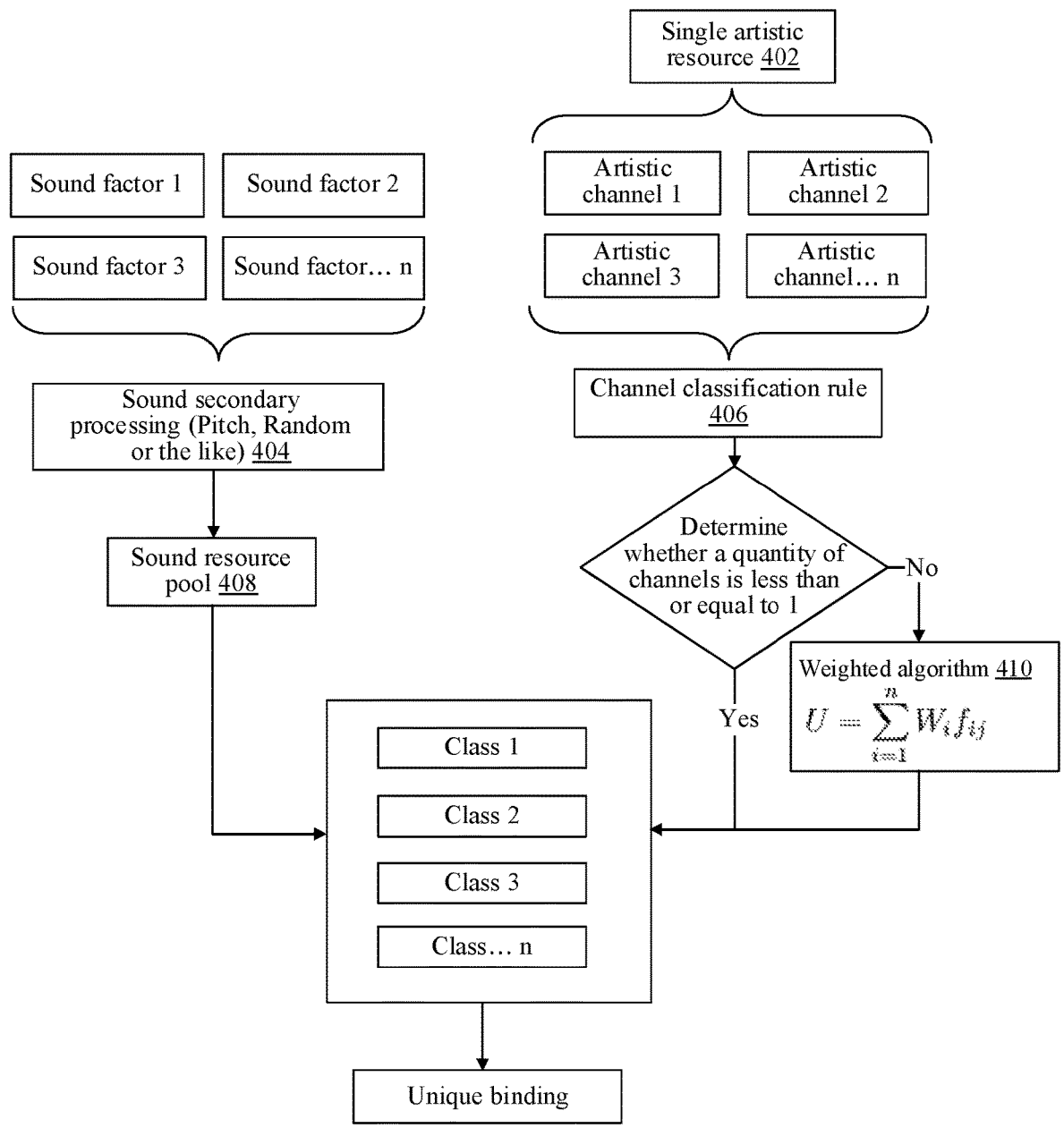
FIG. 4 is a schematic diagram of an audio playing method according to an embodiment of this application.

For example, referring to FIG. 4, an example in which sound resources are bound to artistic channels is used. Secondary processing 404 may be performed on n sound factors (audio sample files), to obtain a plurality of sound resources (audio resources), and the plurality of sound resources are put into a sound resource pool 408. For a single artistic resource 402 (that is, an appearance of the virtual object), the artistic resource may include n artistic channels, and the artistic channels may be classified based on a channel classification rule 406, to obtain at least one group of artistic channels. That is, information of the virtual object is classified to obtain at least one group of attribute classification information. For each group of artistic channels, it may be determined whether a quantity of channels included in the group is less than or equal to 1. If yes, the group may be directly matched with the sound resources, and this corresponds to the foregoing step 203 and step 204. If not, matching may be performed after a weighted result is obtained based on a weighted algorithm 410, so that an audio resource is uniquely bound to each group of artistic channels.

In this embodiment of this application, for a virtual object, audio resources and play triggering conditions that correspond to behaviors or appearances of the virtual object may be determined according to attribute information of the virtual object, so that upon detection that behavior information or appearance information of the virtual object satisfies any play triggering condition, an audio resource matching the play triggering condition may be obtained and played. In a case that the virtual object is generated randomly or information of the virtual object changes, a corresponding audio resource may be determined according to the attribute information of the virtual object. It is unnecessary to manually store a correspondence between the play triggering conditions of the virtual object and the audio resources in advance, so that the maintenance costs are low and the efficiency is high. Moreover, an audio playing effect can fit an image or a state of the virtual object, thus achieving good adaptability.

An optional embodiment of this application may be formed using any combination of all the foregoing optional technical solutions, and details are not described herein again.

It is to be understood that the steps in the embodiments of this application are not necessarily performed sequentially in an order indicated by the step numbers. Unless otherwise explicitly specified in this application, execution of the steps is not strictly limited, and the steps may be performed in other orders. Moreover, at least some of the steps in each embodiment may include a plurality of sub-steps or a plurality of stages. The sub-steps or stages are not necessarily performed at the same moment but may be performed at different moments. The sub-steps or stages are not necessarily sequentially performed, but may be performed in turn or alternately with other steps or at least some of sub-steps or stages of other steps.

In an embodiment, a terminal is further provided. The terminal includes an audio playing apparatus. The audio playing apparatus includes various modules, and all or some of the modules may be implemented by software, hardware, or a combination thereof.

Figure 5:
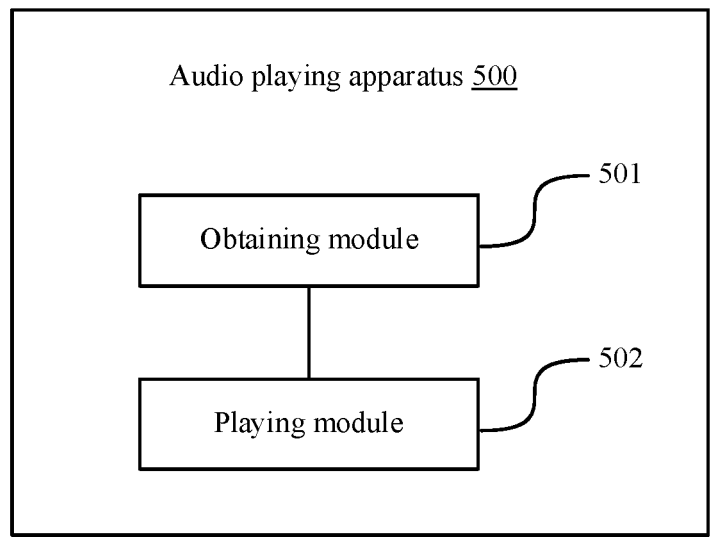
FIG. 5 is a schematic structural diagram of an audio playing apparatus according to an embodiment of this application.

FIG. 5 is a schematic structural diagram of an audio playing apparatus 500 according to an embodiment of this application. Referring to FIG. 5, the apparatus 500 includes:
　　an obtaining module 501, configured to obtain behavior information or appearance information of a virtual object;
　　the obtaining module 501 being further configured to obtain, upon detecting that the behavior information or the appearance information satisfies any play triggering condition, an audio resource matching the play triggering condition, the play triggering condition being determined according to attribute information of the virtual object; and
　　a playing module 502, configured to play the audio resource matching the play triggering condition.

In some embodiments, the obtaining module 501 is further configured to obtain the attribute information of the virtual object; and
　　the apparatus 500 further includes:
　　a grouping module, configured to group the attribute information of the virtual object according to an information classification rule, to obtain at least one group of attribute classification information, each group of attribute classification information corresponding to one behavior or one appearance of the virtual object; and
　　a determining module, configured to determine an audio resource matching each group of attribute classification information based on the at least one group of attribute classification information and a plurality of audio resources, each group of attribute classification information serving as a play triggering condition of the matching audio resource.

In some embodiments, the obtaining module 501 is further configured to obtain a plurality of audio sample files; and
　　the apparatus 500 further includes:
　　an audio processing module, configured to process the plurality of audio sample files, to obtain a plurality of audio resources, where a quantity of the audio resources is greater than a quantity of the audio sample files.

In some embodiments, the audio processing module is configured to perform tone modification processing, frequency modification processing or speed modification processing on the plurality of audio sample files, to obtain the plurality of audio resources.

In some embodiments, the determining module is configured to:
　　match, for any group of attribute classification information in the at least one group of attribute classification information in a case that the any group of attribute classification information includes only one type of information, the information with the plurality of audio resources, to obtain an audio resource matching the information; and store a correspondence between the information and the audio resource matching the information, the information being a play triggering condition of the audio resource.

In some embodiments, the determining module is configured to:

calculate, for any group of attribute classification information in the at least one group of attribute classification information in a case that the any group of attribute classification information includes multiple types of information, a weighted sum of the multiple types of information using a preset weighted algorithm, to obtain a weighted result;

match the weighted result with the plurality of audio resources, to obtain an audio resource matching the weighted result; and store a correspondence between the any group of attribute classification information including the multiple types of information and the audio resource matching the weighted result, the any group of attribute classification information being a play triggering condition of the audio resource matching the weighted result.

In some embodiments, the determining module is configured to:

match the weighted result with identification information of each audio resource; and use an audio resource corresponding to identification information with a highest similarity with the weighted result as the audio resource matching the weighted result.

In some embodiments, the grouping module and the determining module are further configured to: upon detecting that the attribute information of the virtual object is updated, perform again, based on updated attribute information, the steps of grouping the attribute information of the virtual object according to an information classification rule, to obtain at least one group of attribute classification information and determining an audio resource matching each group of attribute classification information based on the at least one group of attribute classification information and a plurality of audio resources.

For a virtual object, the apparatus provided in this embodiment of this application may determine, according to attribute information of the virtual object, audio resources and play triggering conditions that correspond to behaviors or appearances of the virtual object, so that upon detection that behavior information or appearance information of the virtual object satisfies any play triggering condition, an audio resource matching the play triggering condition may be obtained and played. In a case that the virtual object is generated randomly or information of the virtual object changes, a corresponding audio resource may be determined according to the attribute information of the virtual object. It is unnecessary to manually store a correspondence between the play triggering conditions of the virtual object and the audio resources in advance, so that the maintenance costs are low and the efficiency is high. Moreover, an audio playing effect can fit an image or a state of the virtual object, thus achieving good adaptability.

When the audio playing apparatus provided in the foregoing embodiment plays an audio, classification of the foregoing functional modules is merely used as an example for description. In actual application, the foregoing functions may be allocated to different functional modules for implementation according to requirements. That is, an internal structure of the apparatus is divided into different functional modules, to implement all or some of the functions described above. In addition, the audio playing apparatus provided in the foregoing embodiment belongs to the same conception as the embodiment of the audio playing method. For details of a specific implementation process, refer to the method embodiment. Details are not described herein again.

Figure 6:
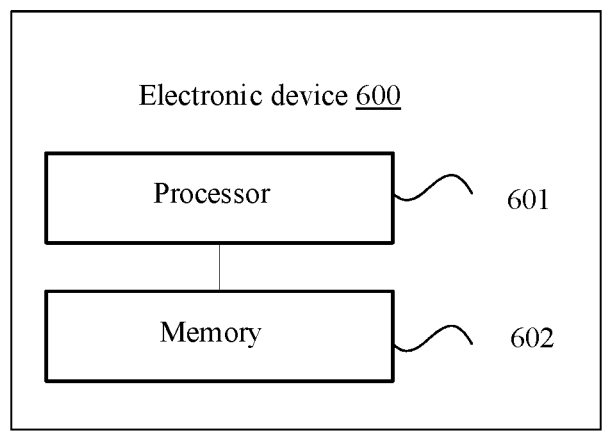
FIG. 6 is a schematic structural diagram of an electronic device according to an embodiment of this application.

FIG. 6 is a schematic structural diagram of an electronic device according to an embodiment of this application. The electronic device 600 may be provided as the foregoing terminal. The electronic device 600 may vary a lot due to different configurations or performance, and may include one or more central processing units (CPUs) 601 and one or more memories 602. The memory 602 stores at least one instruction, the at least one instruction being loaded and executed by the processor 601 to implement the audio playing method provided in the foregoing method embodiments. Definitely, the electronic device may further include components such as a wired or wireless network interface, a keyboard, and an I/O interface, for inputting and outputting. The electronic device may further include another component configured to implement a device function. Details are not described herein again.

Figure 7:
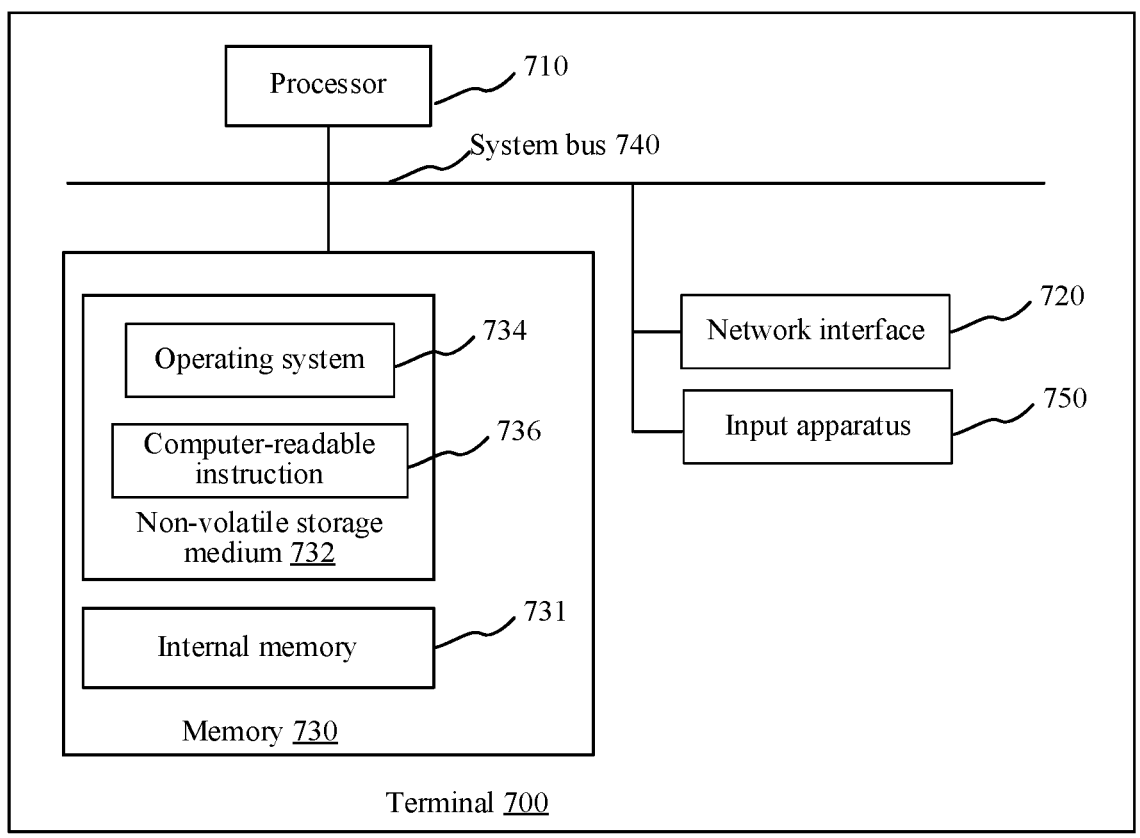
FIG. 7 is a diagram of an internal structure of a terminal according to an embodiment of this application.

FIG. 7 is a schematic diagram of an internal structure of a terminal according to an embodiment. As shown in FIG. 7, the terminal 700 includes a processor 710, a memory 730, a network interface 720, and an input apparatus 750 that are connected using a system bus 740. The memory 730 includes a non-volatile storage medium 732 and an internal memory 731. The non-volatile storage medium 732 of the terminal 700 stores an operating system 734, and may further store a computer-readable instruction 736. When executed by the processor 710, the computer-readable instruction 736 may cause the processor 710 to implement the audio playing method. The internal memory 731 may also store a computer-readable instruction. When executed by the processor 710, the computer-readable instruction may cause the processor 710 to perform the audio playing method. The input apparatus 750 may be a touch layer covering a display screen, or may be a button, a trackball, or a touch panel disposed on a housing of a computer device, or may be an external keyboard, a touch panel, or a mouse.

A person skilled in the art may understand that, in the structure shown in FIG. 7, only a block diagram of a partial structure related to the solution in this application is shown, which does not constitute a limitation to the terminal to which the solution in this application is applied. Specifically, the terminal may include more or fewer components than those shown in the figure, or some components may be combined, or a different component deployment may be used.

In an embodiment, the audio playing apparatus provided in this application may be implemented in a form of a computer-readable instruction, and the computer-readable instruction may run on the terminal shown in FIG. 7. The memory of the terminal may store various program modules forming the audio playing apparatus, for example, the obtaining module 501 and the playing module 502. A computer-readable instruction formed by the program modules causes a processor to perform the steps in the audio playing method in the embodiments of this application described in this specification.

An embodiment of this application provides a non-transitory machine-readable storage medium. The storage medium stores a non-transitory machine-readable instruction, the non-transitory machine-readable instruction being loaded and executed by a processor to perform operations in the audio playing method according to the foregoing embodiments.

A person of ordinary skill in the art may understand that all or some of the processes of the methods in the foregoing embodiments may be implemented by a computer program instructing relevant hardware. The program may be stored in a non-volatile machine-readable storage medium. When the program is executed, the processes of the foregoing method embodiments may be performed. Any reference to a memory, a storage, a database, or another medium used in the embodiments provided in this application can include a non-volatile and/or volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a RAM or an external cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a Rambus direct RAM (RDRAM), a direct Rambus dynamic RAM (DRDRAM), and a Rambus dynamic RAM (DRAM).

A person skilled in the art can easily figure out other implementation solutions of this application after considering the specification and practicing this application disclosed herein. This application is intended to cover any variation, use, or adaptive change of this application. Such variations, uses, or adaptive changes follow the general principles of this application and include common general knowledge or common technical means in the art that are not disclosed in this application. The specification and the embodiments are merely considered as examples, and the real scope and spirit of this application are pointed out in the following claims.

It is to be understood that this application is not limited to the precise structures described above and shown in the accompanying drawings, and various modifications and changes can be made without departing from the scope of this application. The scope of this application is subject only to the appended claims.

What is claimed is:

1. An method for playing audio, comprising:
obtaining attribute information of a virtual object;
grouping the attribute information of the virtual object according to an information classification rule, to obtain at least one group of attribute classification information, each of which corresponding to one behavior or one appearance of the virtual object; and
for each of the at least one group of attribute classification information, determining an audio resource matching the group of attribute classification information from a plurality of audio resources, the group of attribute classification information serving as a play triggering condition matching the audio resource;
obtaining behavior information or appearance information of a virtual object;
in response to the behavior information or the appearance information satisfying a play triggering condition, obtaining an audio resource matching the play triggering condition; and
playing the audio resource matching the play triggering condition.

2. The method of claim 1, further comprising:
obtaining a plurality of audio sample files; and
processing the plurality of audio sample files to obtain the plurality of audio resources, a quantity of the audio resources being greater than a quantity of the plurality of audio sample files.

3. The method of claim 2, wherein processing the plurality of audio sample files comprises:
performing at least one of tone modification processing, frequency modification processing or speed modification processing on the plurality of audio sample files, to obtain the plurality of audio resources.

4. The method of claim 2, further comprising:
obtaining respective identification information for each of the plurality of audio resources; and
storing the plurality of audio resources and the respective identification information, the respective identification information representing information on a virtual object corresponding to an audio resource.

5. The method of claim 1, wherein determining the audio resource matching the group of attribute classification information comprises:
in response to the group of attribute classification information comprising a single type of information,
obtaining an audio resource matching the type of information from the plurality of audio resources, and
storing a correspondence between the type of information and the audio resource matching the type of information, the type of information serving as a play triggering condition of the audio resource matching the type of information.

6. The method of claim 5, wherein further comprising:
converting a form of the group of attribute classification information into a target form, the target form comprises a character form or a character string form.

7. The method of claim 1, wherein determining the audio resource matching the group of attribute classification information comprises:
in response to the group of attribute classification information comprising multiple types of information,
weighting and summing the multiple types of information using a preset weighted algorithm to obtain a weighted result,
matching the weighted result with the plurality of audio resources to obtain an audio resource matching the weighted result, and
storing a correspondence between the group of attribute classification information and the audio resource matching the weighted result, the group of attribute classification information serving as a play triggering condition of the audio resource matching the weighted result.

8. The method of claim 7, wherein matching the weighted result with the plurality of audio resources to obtain the audio resource matching the weighted result comprises:
matching the weighted result with respective identification information of each of the plurality of audio resources to determine respective similarities between the weighted result and the respective identification information; and
selecting an audio resource whose identification information having a highest similarity with the weighted result as the audio resource matching the weighted result.

9. The method of claim 8, wherein selecting the audio resource whose identification information having a highest similarity with the weighted result as the audio resource matching the weighted result comprises:

selecting candidate similarities higher than a predetermined threshold from the respective similarities; and selecting an audio resource whose identification information having a highest similarity of the candidate similarities as the audio resource matching the weighted result.

10. The method of claim 9, further comprising:

in response to the respective similarities being lower than the predetermined threshold, determining the group of attribute classification information fails to serve as a play triggering condition of an audio resource.

11. The method of claim 1, further comprising:

in response to the attribute information of the virtual object being updated, grouping the updated attribute information of the virtual object according to an information classification rule, to obtain at least one group of updated attribute classification information, and for each of the least one group of updated attribute classification information, determining an audio resource matching the group of updated attribute classification information based on the at least one group of updated attribute classification information and a plurality of audio resources.

12. An apparatus for playing audio, comprising:

a memory operable to store program code; and a processor operable to read the program code and configured to:

obtain attribute information of a virtual object;

group the attribute information of the virtual object according to an information classification rule, to obtain at least one group of attribute classification information, each of which corresponding to one behavior or one appearance of the virtual object; and for each of the at least one group of attribute classification information, determine an audio resource matching the group of attribute classification information from a plurality of audio resources, the group of attribute classification information serving as a play triggering condition matching the audio resource;

obtain behavior information or appearance information of a virtual object;

in response to the behavior information or the appearance information satisfying a play triggering condition, obtain an audio resource matching the play triggering condition; and play the audio resource matching the play triggering condition.

13. The apparatus of claim 12, wherein the processor is configured to:

obtain a plurality of audio sample files; and process the plurality of audio sample files to obtain the plurality of audio resources, a quantity of the audio resources being greater than a quantity of the plurality of audio sample files.

14. The apparatus of claim 13, wherein the processor is configured to:

perform at least one of tone modification processing, frequency modification processing or speed modification processing on the plurality of audio sample files, to obtain the plurality of audio resources.

15. The apparatus of claim 12, wherein the processor is configured to:

in response to the group of attribute classification information comprising a single type of information, obtain an audio resource matching the type of information from the plurality of audio resources, and store a correspondence between the type of information and the audio resource matching the type of information, the type of information serving as a play triggering condition of the audio resource matching the type of information.

16. The apparatus of claim 12, wherein the processor is configured to:

in response to the group of attribute classification information comprising multiple types of information, weight and sum the multiple types of information using a preset weighted algorithm to obtain a weighted result, match the weighted result with the plurality of audio resources to obtain an audio resource matching the weighted result, and store a correspondence between the group of attribute classification information and the audio resource matching the weighted result, the group of attribute classification information serving as a play triggering condition of the audio resource matching the weighted result.

17. The apparatus of claim 12, the processor is further configured to:

in response to the attribute information of the virtual object being updated, group the updated attribute information of the virtual object according to an information classification rule, to obtain at least one group of updated attribute classification information, and for each of the least one group of updated attribute classification information, determine an audio resource matching the group of updated attribute classification information based on the at least one group of updated attribute classification information and a plurality of audio resources.

18. A non-transitory machine-readable storage medium, having processor executable instructions stored thereon for causing a processor to:

obtain attribute information of a virtual object;

group the attribute information of the virtual object according to an information classification rule, to obtain at least one group of attribute classification information, each of which corresponding to one behavior or one appearance of the virtual object; and for each of the at least one group of attribute classification information, determine an audio resource matching the group of attribute classification information from a plurality of audio resources, the group of attribute classification information serving as a play triggering condition matching the audio resource;

obtain behavior information or appearance information of a virtual object;

in response to detecting that the behavior information or the appearance information satisfies a play triggering condition, obtain an audio resource matching the play triggering condition; and play the audio resource matching the play triggering condition.

* * * * *